United States Patent
Hornback et al.

(10) Patent No.: US 9,737,908 B2
(45) Date of Patent: Aug. 22, 2017

(54) ANTI-DEPOSIT FORMING SURFACE FINISH FOR EXHAUST SYSTEM MIXER

(71) Applicant: Faurecia Emissions Control Technologies, USA, LLC, Columbus, IN (US)

(72) Inventors: Jerome Brian Hornback, Greenwood, IN (US); Chris Chapman, Columbus, IN (US)

(73) Assignee: Faurecia Emissions Control Technologies USA, LLC, Columbus, IN (US)

( * ) Notice: Subject to any disclaimer, the term of this patent is extended or adjusted under 35 U.S.C. 154(b) by 0 days.

(21) Appl. No.: 15/355,154

(22) Filed: Nov. 18, 2016

(65) Prior Publication Data

US 2017/0066012 A1    Mar. 9, 2017

Related U.S. Application Data

(62) Division of application No. 14/430,950, filed as application No. PCT/US2012/057693 on Sep. 28, 2012.

(51) Int. Cl.
| | |
|---|---|
| *B05D 5/08* | (2006.01) |
| *F01N 3/20* | (2006.01) |
| *F01N 3/24* | (2006.01) |
| *F01N 13/10* | (2010.01) |
| *F01N 3/035* | (2006.01) |

(Continued)

(52) U.S. Cl.
CPC .............. *B05D 5/08* (2013.01); *B01D 53/92* (2013.01); *B01F 3/04021* (2013.01); *B01F 5/0606* (2013.01); *B01F 5/0615* (2013.01); *B01F 15/00844* (2013.01); *B05D 1/02* (2013.01); *B05D 7/22* (2013.01); *B21D 22/02* (2013.01); *F01N 3/035* (2013.01); *F01N 3/2066* (2013.01); *F01N 3/24* (2013.01); *F01N 3/2892* (2013.01); *F01N 13/009* (2014.06); *F01N 13/10* (2013.01); *F01N 13/16* (2013.01); *B01F 2005/0097* (2013.01); *F01N 2240/20* (2013.01); *F01N 2510/06* (2013.01); *F01N 2610/00* (2013.01);

(Continued)

(58) Field of Classification Search
CPC ....... B01D 5/08; F01N 3/2066; F01N 3/2892; F01N 2610/00; B21D 22/02; B05D 7/22
USPC .............................. 29/888, 888.01; 422/168
See application file for complete search history.

(56) References Cited

U.S. PATENT DOCUMENTS

| | | |
|---|---|---|
| 7,963,104 B2 | 6/2011 | Girard et al. |
| 8,114,364 B2 | 2/2012 | Harinath et al. |
| 2012/0216513 A1 | 8/2012 | Greber et al. |

FOREIGN PATENT DOCUMENTS

| | | |
|---|---|---|
| JP | 11-159320 A | 6/1999 |
| JP | 2006167576 A | 6/2006 |

(Continued)

OTHER PUBLICATIONS

International Preliminary Report on Patentability for PCT Application No. PCT/US2012/057693, mailed Apr. 9, 2015.

*Primary Examiner* — Tom P Duong
(74) *Attorney, Agent, or Firm* — Carlson, Gaskey & Olds, PC

(57) ABSTRACT

A vehicle exhaust system includes a mixer having an inlet that receives engine exhaust gases and an outlet to direct swirling engine exhaust gas to a downstream exhaust component. The mixer has a plurality of internal surfaces that come into contact with the engine exhaust gases. At least one (Continued)

of the internal surfaces has a coating comprised of a low-coefficient of friction material.

14 Claims, 3 Drawing Sheets

(51) Int. Cl.
*F01N 13/00* (2010.01)
*B01D 53/92* (2006.01)
*B01F 3/04* (2006.01)
*B01F 5/06* (2006.01)
*B01F 15/00* (2006.01)
*F01N 3/28* (2006.01)
*F01N 13/16* (2010.01)
*B05D 1/02* (2006.01)
*B05D 7/22* (2006.01)
*B21D 22/02* (2006.01)
*B01F 5/00* (2006.01)

(52) U.S. Cl.
CPC .. *F01N 2610/02* (2013.01); *F01N 2610/1453* (2013.01); *Y02T 10/24* (2013.01)

(56) References Cited

FOREIGN PATENT DOCUMENTS

| KR | 10-0986358 B1 | 10/2010 |
|---|---|---|
| WO | 2010088208 | 8/2010 |

ANTI-DEPOSIT FORMING SURFACE FINISH FOR EXHAUST SYSTEM MIXER

CROSS-REFERENCE TO RELATED APPLICATION

This application is a divisional of U.S. application Ser. No. 14/430,950, filed Mar. 25, 2015, which is the U.S. national phase of PCT/US2012/057693, filed Sep. 28, 2012.

BACKGROUND OF THE INVENTION

A vehicle exhaust system conducts hot exhaust gases generated by an engine through various exhaust components to reduce emissions and control noise. The exhaust system includes an injection system that injects a reducing agent, such as a solution of urea and water for example, upstream of a selective catalytic reduction (SCR) catalyst. A mixer is positioned upstream of the SCR catalyst and mixes engine exhaust gases and products of urea transformation.

The injector typically sprays the urea into the exhaust stream. The spray makes contact with the mixer and surrounding walls which have been heated by the exhaust gases. As droplets of the urea contact these heated structures, the surfaces cool down which favors a local formation of urea deposits. These deposits can adversely affect flow circulation and operating efficiency.

SUMMARY OF THE INVENTION

In one exemplary embodiment, a vehicle exhaust system includes a mixer having an inlet that receives engine exhaust gases and an outlet to direct swirling engine exhaust gas to a downstream exhaust component. The mixer has a plurality of internal surfaces that come into contact with the engine exhaust gases. At least one of the internal surfaces has a coating comprised of a low-coefficient of friction material.

In a further embodiment of the above, all of the internal surfaces include a coating comprised of the low-coefficient of friction material.

In a further embodiment of any of the above, the low-coefficient of friction material comprises a non-stick material, such as Teflon® for example.

In a further embodiment of any of the above, the mixer includes at least one baffle configured to swirl the engine exhaust gases, and wherein the plurality of internal surfaces includes a plurality of internal baffle surfaces for the at least one baffle, the internal baffle surfaces including the coating.

In a further embodiment of the above, the at least one baffle comprises at least an upstream baffle and a downstream baffle, and wherein both the upstream and downstream baffles have internal baffle surfaces with the coating.

In one exemplary embodiment, a vehicle exhaust system includes a first exhaust component having an inlet to receive engine exhaust gases, a second exhaust component positioned downstream of the first exhaust component, and a mixer positioned downstream of the first component and upstream of the second exhaust component. The mixer has an inlet configured to receive engine exhaust gases exiting the first exhaust component and an outlet to direct swirling engine exhaust gas to the second exhaust component. The mixer has a plurality of internal surfaces that come into contact with the engine exhaust gases, and wherein at least one of the internal surfaces has a coating comprised of a low-coefficient of friction material.

In a further embodiment of the above, the exhaust system includes an injection system having a fluid supply and an injector that injects fluid from the fluid supply into the engine exhaust gases such that the mixer mixes the fluid and engine exhaust gas. The mixer includes an outer peripheral surface with an injector boss having an opening to receive the injector.

In one exemplary embodiment, a method of manufacturing a mixer for a vehicle exhaust system comprises the steps of: providing a mixer having an inlet configured to receive engine exhaust gases and an outlet to direct swirling engine exhaust gas to a downstream exhaust component, the mixer having a plurality of internal surfaces that come into contact with the engine exhaust gases, and coating a least one internal surface with a low-coefficient of friction coating.

These and other features of this application will be best understood from the following specification and drawings, the following of which is a brief description.

DETAILED DESCRIPTION

Figure 1:
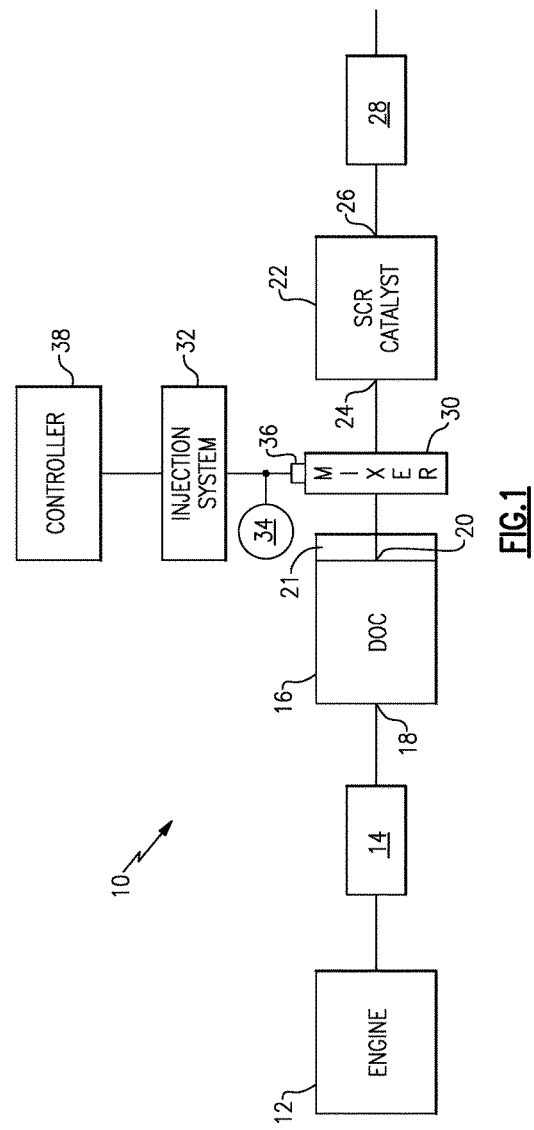
FIG. 1 schematically illustrates one example of an exhaust system with a mixer according to the subject invention.
Figure 2:
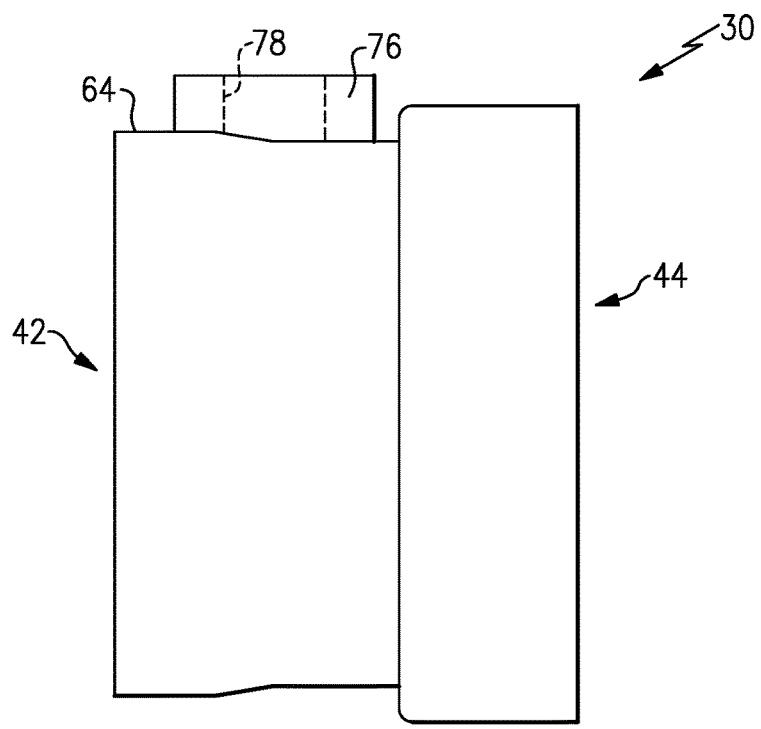
FIG. 2 is a side view of the mixer of FIG. 1.

FIG. 1 shows a vehicle exhaust system 10 that conducts hot exhaust gases generated by an engine 12 through various upstream exhaust components 14 to reduce emission and control noise as known. The various upstream exhaust components 14 can include one or more of the following: pipes, filters, valves, catalysts, mufflers etc. In one example configuration, the upstream exhaust components 14 direct exhaust gases into a diesel oxidation catalyst (DOC) 16 having an inlet 18 and an outlet 20. Downstream of the DOC 16 is a diesel particulate filter (DPF) 21 that is used to remove contaminants from the exhaust gas as known. Downstream of the DOC 16 and DPF 21 is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

A mixer 30 is positioned downstream from the outlet 20 of the DOC 16 and upstream of the inlet 24 of the SCR catalyst 22. The mixer 30 is used to generate a swirling or rotary motion of the exhaust gas. Any type of mixing element can be used, such as that set forth in US 2012/0216513 for example, which is assigned to the assignee of the present invention and is herein incorporated by reference.

An injection system 32 is used to inject a reducing agent, such as a solution of urea and water for example, into the exhaust gas stream upstream from the SCR catalyst 22 such that the mixer 30 can mix the urea and exhaust gas thoroughly together. The injection system 32 includes a fluid supply 34, an injector 36, and a controller 38 that controls injection of the urea as known.

The mixer 30 is shown in greater detail in FIGS. 2-5. The mixer 30 has an inlet end 42 (FIG. 2) configured to receive the engine exhaust gases and an outlet end 44 to direct a mixture of swirling engine exhaust gas and products transformed from urea to the SCR catalyst 22. As shown in the cross-sectional view of FIG. 5, the mixer 30 has a plurality of internal surfaces, indicated generally at 46, that come into contact with the urea and engine exhaust gases. As the urea contacts these surfaces, the surfaces cool which can lead to formation of urea deposits. In order to discourage formation of urea deposits, one or more of these internal surfaces has a coating comprised of a low-coefficient of friction material.

Figure 6:
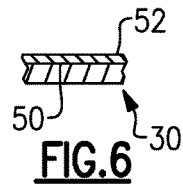
FIG. 6 is a schematic cross-sectional view showing a coating on an internal surface of the mixer.

In one example, the mixer 30 is comprised of one or more stamped metal sheets that are attached to each other. As shown in FIG. 6, one internal metal surface 50 has a coating 52 or layer of low-coefficient of friction material applied. In one example, all of the internal surfaces include a coating comprised of the low-coefficient of friction material.

Figure 3:
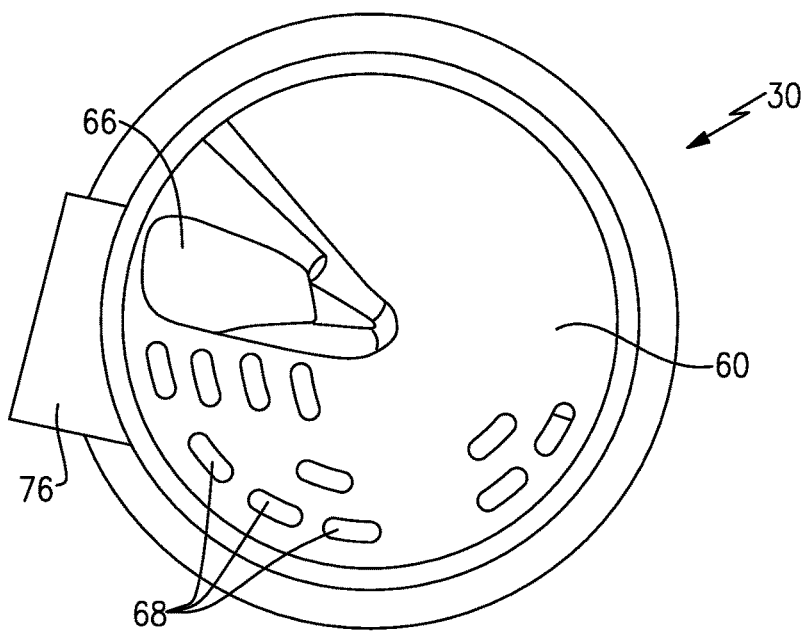
FIG. 3 is one end view of the mixer of FIG. 2.
Figure 4:
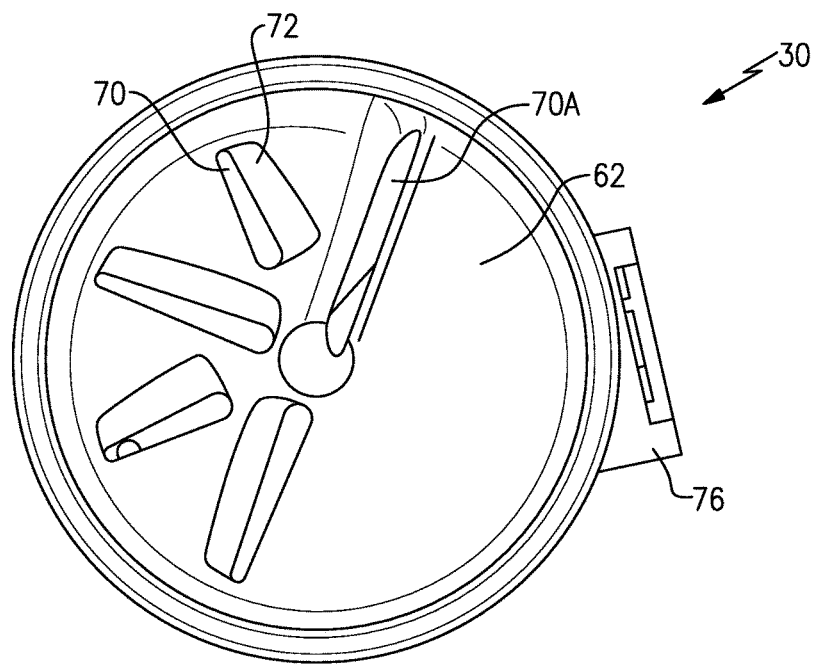
FIG. 4 is an opposite end view of the mixer of FIG. 3.
Figure 5:
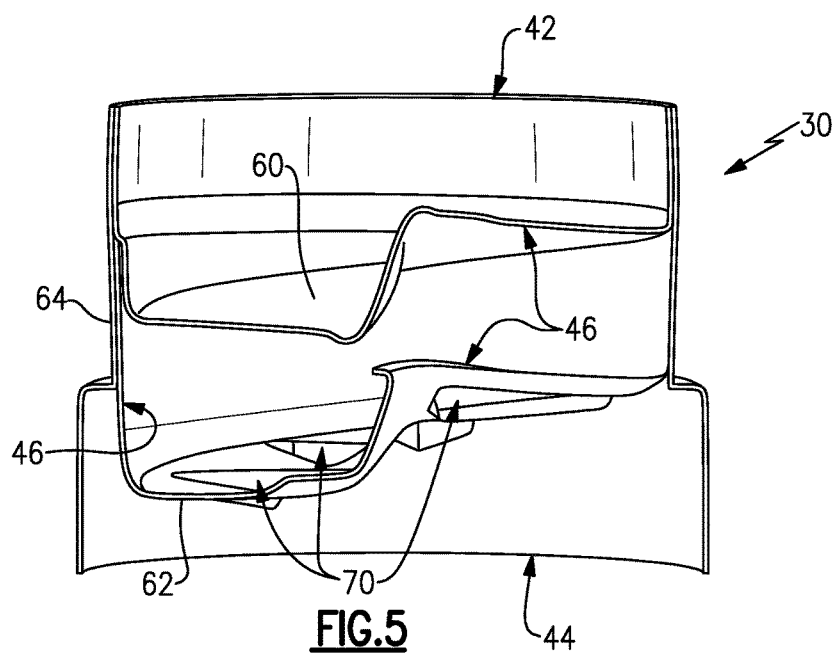
FIG. 5 is a side view similar to FIG. 2 but with a cutaway portion to show internal surfaces of the mixer.

As shown in FIGS. 3-5, the mixer 30 includes an upstream baffle 60 and a downstream baffle 62 that are surrounded by an outer peripheral surface 64. Both the upstream 60 and downstream 62 baffles have internal baffle surfaces that are covered by the coating 52. The upstream baffle 60 at the inlet 42 includes a large opening 66 (FIG. 3) that receives the majority of the exhaust gas (receives at least 60% of the exhaust mass flow rate) and which is configured to initiate the swirling motion. The upstream baffle 60 also includes a plurality of perforations 68 that ensure optimal homogenization of exhaust gases and reduces back pressure. The downstream baffle 62 includes a plurality of openings 70 and deflector portions 72 through which the exhaust gas exits. The main exit of the mixture is through the largest opening 70A (FIG. 4). Additional details regarding the operation of the upstream 60 and downstream baffles 62 can be found in US 2012/0216513.

The outer peripheral surface 64 of the mixer 30 includes an injector boss 76 having an opening 78 to receive the injector 36. The opening 78 is generally positioned axially between the upstream 60 and downstream 62 baffles such that urea is sprayed into a swirling gas flow that is initiated by the upstream baffle 60.

As discussed above, the internal surfaces of the mixer 30 are coated with a low-coefficient of friction material to discourage the formation of urea deposits. This low-coefficient of friction material must be able to perform under severe operating conditions, which include a corrosive and high temperature environment, without degrading. In one example, the low-coefficient of friction material comprises a non-stick material. One example of a non-stick material is Teflon®, for example; however, other low-coefficient of friction materials could also be used.

In one example, a method for manufacturing the mixer 30 includes the following steps. A mixer 30 is provided to have an inlet 42 configured to receive engine exhaust gases and an outlet 44 to direct swirling engine exhaust gas to a downstream exhaust component. In one example, the mixer body is formed from a plurality of stamped metal sheets. The mixer has a plurality of internal surfaces that will come into contact with the engine exhaust gases. One or more of the internal surfaces are coated with the coating 52. The coating can be sprayed onto the desired areas, the entire mixer can be sprayed, or the mixer could be dipped into the coating material. These are just some examples of how the coating is applied, it should be understood that other coating methods could also be used.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of manufacturing a mixer for a vehicle exhaust system comprising the steps of: providing a mixer having an upstream end configured to be fixed to an upstream exhaust component and a downstream end configured to be fixed to a downstream exhaust component, the mixer having an inlet configured to receive engine exhaust gases and an outlet to direct swirling engine exhaust gas to the downstream exhaust component, and the mixer further including an upstream baffle and a downstream baffle that are surrounded by an outer peripheral surface to define an area between the upstream and downstream baffles, and the mixer having a plurality of internal surfaces that come into contact with the engine exhaust gases; providing both the upstream and downstream baffles with internal baffle surfaces that face the area and that are in contact with hot engine exhaust gases; and coating the internal baffle surfaces of the upstream and downstream baffles with a low-coefficient of friction material.

2. The method according to claim 1 including coating all of the internal surfaces of the mixer with the low-coefficient of friction material.

3. The method according to claim 1 wherein the low-coefficient of friction material comprises a non-stick coating material.

4. The method according to claim 3 wherein the non-stick coating material comprises Teflon®.

5. The method according to claim 1 including coating all of the internal baffle surfaces of the upstream and downstream baffles with the low-coefficient of friction material.

6. The method according to claim 1 wherein the mixer includes a body that defines an internal cavity and that includes an outer peripheral surface, upstream baffle and downstream baffle being positioned within the internal cavity, and further including stamping metal sheets to form the body and the upstream and downstream baffles.

7. The method according to claim 6, including forming an injector boss in the outer peripheral surface of the body, the injector boss having an opening to receive an injector.

8. The method according to claim 7 including positioning the opening axially between the upstream and downstream baffles such that the injector is configured to spray urea into a swirling gas flow that is initiated by the upstream baffle.

9. The method according to claim 8 wherein the upstream baffle includes first internal baffle surfaces formed on a downstream side of the upstream baffle and the downstream baffle includes second internal baffle surfaces formed on an upstream side of the downstream baffle, and further including coating at least the first and second internal baffle surfaces with the low-coefficient of friction material.

10. The method according to claim 9 including spraying the low-coefficient of friction material onto the first and second internal baffle surfaces.

11. The method according to claim 9 including
    stamping the upstream baffle such that the inlet comprises
        at least one primary opening that receives the majority of the exhaust gas and which is configured to initiate the swirling motion, and stamping the downstream baffle such that the outlet comprises a plurality of openings and deflector portions through which the exhaust gas exits.

12. The method according to claim 11 wherein the primary opening is configured to receive at least 60% of the exhaust mass flow rate, and including stamping the upstream baffle to include a plurality of secondary openings that are smaller than the primary opening.

13. The method according to claim 6 wherein the plurality of internal surfaces are formed on the body and upstream and downstream baffles of the mixer, and further including
   spraying the entire mixer with the low-coefficient of friction material.

14. The method according to claim 6 wherein the plurality of internal surfaces are formed on the body and the upstream and downstream baffles of the mixer, and further including dipping the mixer into the low-coefficient of friction material.

\* \* \* \* \*